US 11,785,053 B2

United States Patent
Filsfils et al.

(10) Patent No.: US 11,785,053 B2
(45) Date of Patent: Oct. 10, 2023

(54) SYSTEMS AND METHODS FOR DETERMINING SECURE NETWORK PATHS

(71) Applicant: Cisco Technology, Inc., San Jose, CA (US)

(72) Inventors: Clarence Filsfils, Brussels (BE); David Delano Ward, Somerset, WI (US); Reshad Rahman, Ontario (CA); Subhasri Dhesikan, Flower Mound, TX (US); Eric Albin Voit, Bethesda, MD (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 660 days.

(21) Appl. No.: 16/579,906

(22) Filed: Sep. 24, 2019

(65) Prior Publication Data

US 2020/0322391 A1 Oct. 8, 2020

Related U.S. Application Data

(60) Provisional application No. 62/829,565, filed on Apr. 4, 2019.

(51) Int. Cl.
*H04L 29/06* (2006.01)
*H04L 9/40* (2022.01)
(Continued)

(52) U.S. Cl.
CPC ............ *H04L 63/205* (2013.01); *H04L 12/16* (2013.01); *H04L 45/22* (2013.01); *H04L 45/50* (2013.01);
(Continued)

(58) Field of Classification Search
CPC ...... H04L 63/205; H04L 47/745; H04L 45/02
(Continued)

(56) References Cited

U.S. PATENT DOCUMENTS 7,751,405 B1 * 7/2010 Kompella ............... H04L 45/50
370/254
8,155,000 B2 * 4/2012 Vasseur .................. H04L 45/02
370/352

(Continued)

FOREIGN PATENT DOCUMENTS

CN 101834793 A * 9/2010
CN 107204941 A * 9/2017
(Continued)

OTHER PUBLICATIONS

Awduche et al., "RSVP-TE: Extensions to RSVP for LSP Tunnels", 2001 (Year: 2001).*
(Continued)

*Primary Examiner* — Nam T Tran
(74) *Attorney, Agent, or Firm* — Baker Botts L.L.P.

(57) ABSTRACT

In one embodiment, an apparatus includes one or more processors and one or more computer-readable non-transitory storage media coupled to the one or more processors. The one or more computer-readable non-transitory storage media include instructions that, when executed by the one or more processors, cause the apparatus to perform operations including determining a path through a plurality of provider nodes within a provider network and determining that the path through the plurality of provider nodes within the provider network is secure. The operations also include receiving, from a customer node, a Resource Reservation Protocol (RSVP) path message comprising an attribute for a security request. The operations further include routing the RSVP path message along the path of the plurality of provider nodes.

18 Claims, 5 Drawing Sheets

(51) Int. Cl.
*H04L 12/16* (2006.01)
*H04L 45/00* (2022.01)
*H04L 45/50* (2022.01)
*H04L 47/724* (2022.01)
*H04L 69/326* (2022.01)

(52) U.S. Cl.
CPC ........ *H04L 47/724* (2013.01); *H04L 63/1433* (2013.01); *H04L 69/326* (2013.01)

(58) Field of Classification Search
USPC .......................................................... 726/25
See application file for complete search history.

(56) References Cited

U.S. PATENT DOCUMENTS

| | | | | |
|---|---|---|---|---|
| 10,298,488 | B1* | 5/2019 | Wood | H04L 45/50 |
| 2002/0012359 | A1* | 1/2002 | Kikuchi | H04L 1/0017 |
| | | | | 370/468 |
| 2007/0008882 | A1* | 1/2007 | Oran | H04L 47/724 |
| | | | | 370/229 |
| 2007/0076599 | A1* | 4/2007 | Ayyagari | H04L 47/803 |
| | | | | 370/229 |
| 2007/0133406 | A1* | 6/2007 | Vasseur | H04L 45/02 |
| | | | | 370/230 |
| 2008/0101239 | A1* | 5/2008 | Goode | H04L 12/4641 |
| | | | | 370/235 |
| 2008/0225708 | A1* | 9/2008 | Lange | H04L 47/2475 |
| | | | | 370/230 |
| 2013/0239169 | A1* | 9/2013 | Nakhjiri | H04L 45/306 |
| | | | | 726/1 |
| 2014/0029418 | A1* | 1/2014 | Jain | H04L 45/50 |
| | | | | 370/228 |
| 2015/0128223 | A1* | 5/2015 | Magri | H04L 63/1433 |
| | | | | 726/4 |
| 2016/0119821 | A1* | 4/2016 | Ramachandran | H04L 65/4069 |
| | | | | 370/392 |
| 2019/0098676 | A1* | 3/2019 | Svennebring | H04W 76/14 |

FOREIGN PATENT DOCUMENTS

| | | | | |
|---|---|---|---|---|
| DE | 60109809 | T2 * | 3/2006 | H04L 47/806 |
| EP | 1732268 | A1 * | 12/2006 | H04L 45/502 |
| EP | 2698961 | B1 * | 12/2014 | H04L 45/22 |
| JP | 2004228817 | A * | 8/2004 | |
| JP | 2004260567 | A * | 9/2004 | |
| JP | 2005051811 | A * | 2/2005 | |
| JP | 2015173378 | A * | 10/2015 | |
| WO | WO-2012028409 | A1 * | 3/2012 | H04L 41/0668 |

OTHER PUBLICATIONS

Baker et al., "RSVP Cryptographic Authentication", RFC 2747, 2000 (Year: 2000).*
Berger et al., "RSVP Extensions for IPSEC Data Flows", RFC 2207, 1997 (Year: 1997).*
Braden et al., "Resource Reservation Protocol (RSVP)—Version 1 Functional Specification", RFC 2205, 1997 (Year: 1997).*
Camtepe, "Kerberos Based Security System for Session Initiation Protocol", 1996 (Year: 1996).*
Gao, "Implementation and Validation of the General Internet Signaling Transport Protocol", 2008 (Year: 2008).*
Kim, "Resource Reservation in Shared and Switched Demand Priority Local Area Networks", 1998 (Year: 1998).*
Mankin et al., "Resource Reservation (RSVP)—Version 1 Applicability Statement Some Guidelines on Deployment", RFC 2208, 1997 (Year: 1997).*
Wei et al., "Analysis of Resource ReSerVation Protocol-Traffic Engineering (RSVP-TE) Security According to KARP Design Guide", 2011 (Year: 2011).*
Patent Cooperation Treaty, International Search Report and Written Opinion, International Application No. PCT/US2020/026385, dated Sep. 7, 2020, 22 pages.
Patent Cooperation Treaty, Partial Search Report, International Application No. PCT/US2020/02635, dated Jul. 16, 2020, 15 pages.
Sagara, L., et al., A Distributed Authentication Platform Architecture for Peer-to-Peer Applications, The Institute of Electronics, Information and Communication Engineers (IEICE), vol. E88-B, No. 3, Mar. 2005, pp. 865.
Ahmed, A. et al., "A trust aware routing protocol for energy constrained wireless sensor network," Telecommunications Systems, Baltzer Science Publishers, vol. 61 No. 1, Jun. 10, 2015, pp. 123-140.
Wang, B. et al., A light-weight trust-based QoS routing algorithm for ad hoc networks, Pervasive and Mobile Computing, vol. 13, Jun. 26, 2013, pp. 164-180.
Wei, Y. et al., "Analysis of Resource Reservation Protocol-Traffic Engineering (RSVP-TE) Security According to KARP Design Guide; draft-wei-karp-rsvp-te-analysis-00," Jul. 27, 2011, pp. 1-8.

* cited by examiner

FIG. 5 though the plurality of provider nodes within the provider network is secure. The operations also include receiving, from a customer node, a Resource Reservation Protocol (RSVP) path message comprising an attribute for a security request. The operations further include routing the RSVP path message along the path of the plurality of provider nodes.

SYSTEMS AND METHODS FOR DETERMINING SECURE NETWORK PATHS

CROSS-REFERENCE TO RELATED APPLICATIONS

This application claims benefit of U.S. Provisional Patent Application No. 62/829,565 filed Apr. 4, 2019 by Clarence Filsfils, and entitled "Using attestation tokens to provide Resource Reservation Protocol-Traffic Engineering (RSVP-TE) tunnels that meet certain security level requirements," which is incorporated herein by reference as if reproduced in its entirety.

TECHNICAL FIELD

This disclosure generally relates to determining secure network paths, and more specifically to systems and methods for determining secure network paths using Resource Reservation Protocol (RSVP).

BACKGROUND

Sensitive information may be transmitted through one or more nodes within a network. Certain nodes within the network may become compromised. For example, an attacker may gain access to one or more of the network nodes. If a network node is compromised, traditional protections such as link encryption may prove ineffectual in protecting the sensitive information traversing the compromised node.

DESCRIPTION OF EXAMPLE EMBODIMENTS

Overview

According to an embodiment, a router includes one or more processors and one or more computer-readable non-transitory storage media coupled to the one or more processors. The one or more computer-readable non-transitory storage media include instructions that, when executed by the one or more processors, cause the router to perform operations including determining a path through a plurality of provider nodes within a provider network and determining that the path through the plurality of provider nodes within the provider network is secure. The operations also include receiving, from a customer node, a Resource Reservation Protocol (RSVP) path message comprising an attribute for a security request. The operations further include routing the RSVP path message along the path of the plurality of provider nodes.

The operations may include receiving an RSVP reservation (resv) message from one of the plurality of provider nodes, verifying that the path through the plurality of provider nodes is secure based on the RSVP resv message, communicating, to the customer node, that the path through the plurality of provider nodes is secure, receiving, from the customer node, customer data, and routing the customer data along the path of the plurality of provider nodes. The operations may include determining an alternate path through a plurality of alternate provider nodes within the provider network, determining that the alternate path through the plurality of alternate provider nodes within the provider network is secure, receiving an RSVP path error message from one of the plurality of provider nodes, and routing the RSVP path message along the alternate path of the plurality of alternate provider nodes in response to receiving the RSVP path error message.

In certain embodiments, the router is a provider edge node of the plurality of provider nodes. The operations may include communicating an identity of the provider edge node to the customer node. The RSVP path message may be received by the provider edge node from the customer node in response to communicating the identity of the provider edge node to the customer node. Determining that the path through the plurality of provider nodes within the provider network is secure may include deriving information from each of the plurality of provider nodes from interior gateway protocol (IGP) advertisements and/or a controller of the provider network, determining a security level for each of the plurality of provider nodes based on the derived information, and determining that the security level of each of the plurality of provider nodes is below a predetermined security constraint value. The RSVP path message may also include a Record Route Object (RRO), Label Switched Paths (LSP) attributes, and/or link attributes. Determining that the path through the plurality of provider nodes within the provider network is secure may be performed prior to receiving the RSVP path message from the customer node. The operations may include verifying that the path through the plurality of provider nodes within the provider network is secure after receiving the RSVP path message from the customer node.

According to another embodiment, a method includes determining a path through a plurality of provider nodes within a provider network and determining that the path through the plurality of provider nodes within the provider network is secure. The method also includes receiving, from a customer node, an RSVP path message that includes an attribute for a security request. The method further includes routing the RSVP path message along the path of the plurality of provider nodes.

The method may include receiving an RSVP resv message from one of the provider nodes, verifying that the path through the plurality of provider nodes is secure based on the RSVP resv message, communicating, to the customer node, that the path through the plurality of provider nodes is secure, receiving, from the customer node, customer data, and routing the customer data along the path of the plurality of provider nodes. The method may include determining an alternate path through a plurality of alternate provider nodes within the provider network, determining that the alternate path through the plurality of alternate provider nodes within the provider network is secure, receiving an RSVP path error message from one of the provider nodes, and routing the RSVP path message along the alternate path of the plurality of alternate provider nodes in response to receiving the RSVP path error message.

The method may include communicating an identity of a provider edge node to the customer node. The RSVP path message may be received by the provider edge node from the customer node in response to communicating the identity of the provider edge node to the customer node. Determining that the path through the plurality of provider nodes within the provider network is secure may include deriving information from each of the plurality of provider nodes from IGP advertisements and/or a controller of the provider network, determining a security level for each of the plurality of provider nodes based on the derived information, and determining that the security level of each of the plurality of provider nodes is below a predetermined security constraint value. The RSVP path message may include an RRO, LSP attributes, and/or link attributes. The method may include determining that the path through the plurality of provider nodes within the provider network is secure prior to receiving the RSVP path message from the customer node and verifying that the path through the plurality of provider nodes within the provider network is secure after receiving the RSVP path message from the customer node.

According to yet another embodiment, one or more computer-readable non-transitory storage media embody instructions that, when executed by a processor, cause the processor to perform operations including determining a path through a plurality of provider nodes within a provider network and determining that the path through the plurality of provider nodes within the provider network is secure. The operations also include receiving, from a customer node, an RSVP path message comprising an attribute for a security request. The operations further include routing the RSVP path message along the path of the plurality of provider nodes.

The operations may include receiving an RSVP resv message from one of the plurality of provider nodes, verifying that the path through the plurality of provider nodes is secure based on the RSVP resv message, communicating, to the customer node, that the path through the plurality of provider nodes is secure, receiving, from the customer node, customer data, and routing the customer data along the path of the plurality of provider nodes. The operations may include determining an alternate path through a plurality of alternate provider nodes within the provider network, determining that the alternate path through the plurality of alternate provider nodes within the provider network is secure, receiving an RSVP path error message from one of the plurality of provider nodes, and routing the RSVP path message along the alternate path of the plurality of alternate provider nodes in response to receiving the RSVP path error message.

The operations may include communicating an identity of a provider edge node to the customer node. The RSVP path message may be received by the provider edge node from the customer node in response to communicating the identity of the provider edge node to the customer node. Determining that the path through the plurality of provider nodes within the provider network is secure may include deriving information from each of the plurality of provider nodes from IGP advertisements and/or a controller of the provider network, determining a security level for each of the plurality of provider nodes based on the derived information, and determining that the security level of each of the plurality of provider nodes is below a predetermined security constraint value. The RSVP path message may also include a RRO, LSP attributes, and/or link attributes. Determining that the path through the plurality of provider nodes within the provider network is secure may be performed prior to receiving the RSVP path message from the customer node. The operations may include verifying that the path through the plurality of provider nodes within the provider network is secure after receiving the RSVP path message from the customer node.

Technical advantages of certain embodiments of this disclosure may include one or more of the following. The systems and methods described herein allow a customer to request a path from a provider that meets specific security criteria. The customer can verify that the path selected by the provider meets the specific security criteria before communicating sensitive information to the provider. The provider uses RSVP to verify the security of the path prior to routing the customer's sensitive information through the path.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In certain embodiments of this disclosure, a customer (e.g., a medical, financial, or military organization) signals into a provider (e.g., a service provider) to request a certified path through the nodes of the provider's network to a target host or Internet Protocol (IP) address. The provider replies to the customer whether the provider can provide the requested certified path. In certain embodiments, verifiable specifics associated with establishing trust of the selected certified path is provided to the customer. The verifiable specifics may include attested proof from the transited nodes along the selected certified path that the nodes are secure.

Figure 1:
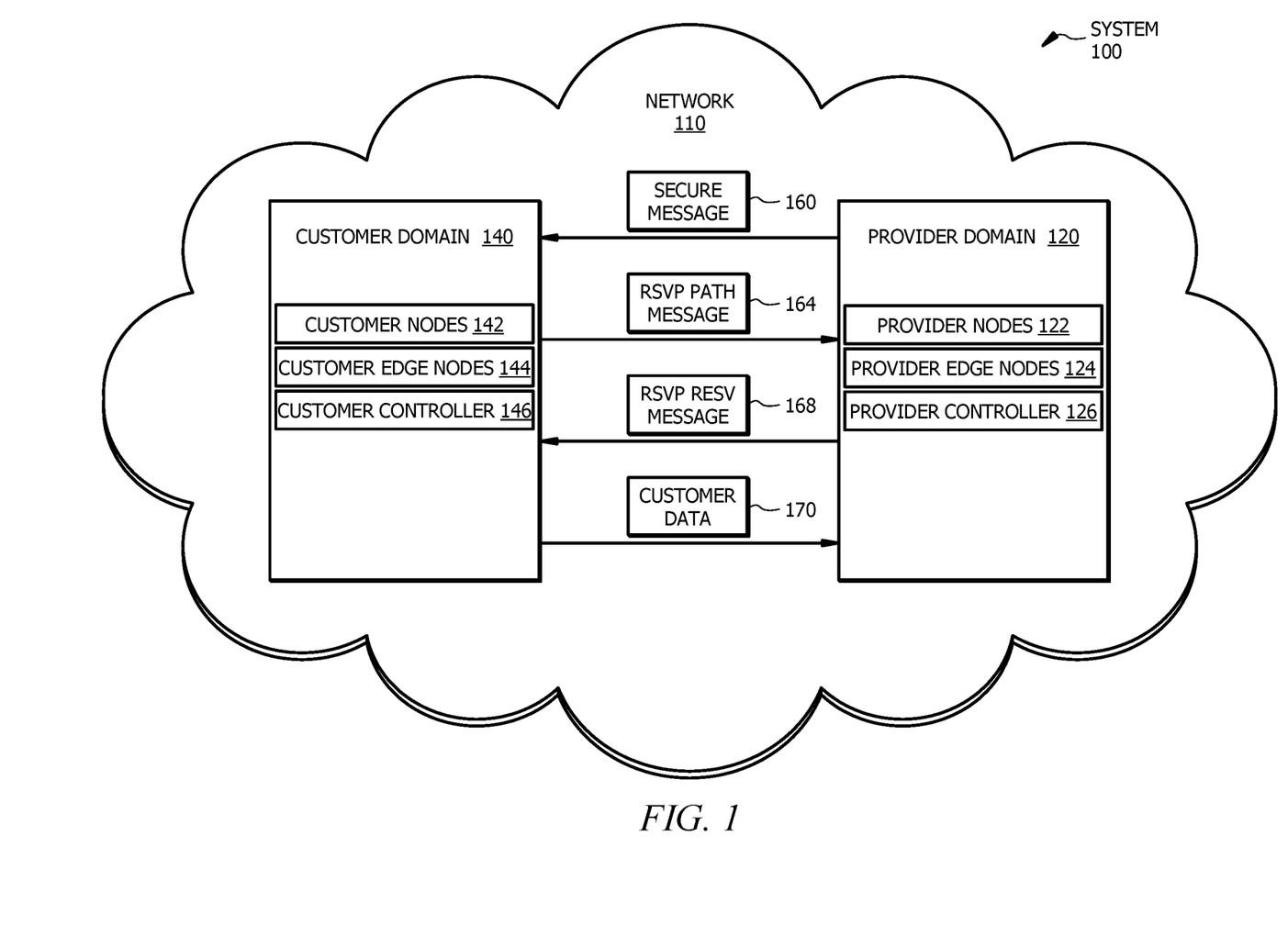
FIG. 1 illustrates a system for determining a secure network path using RSVP, in accordance with certain embodiments.
Figure 2:
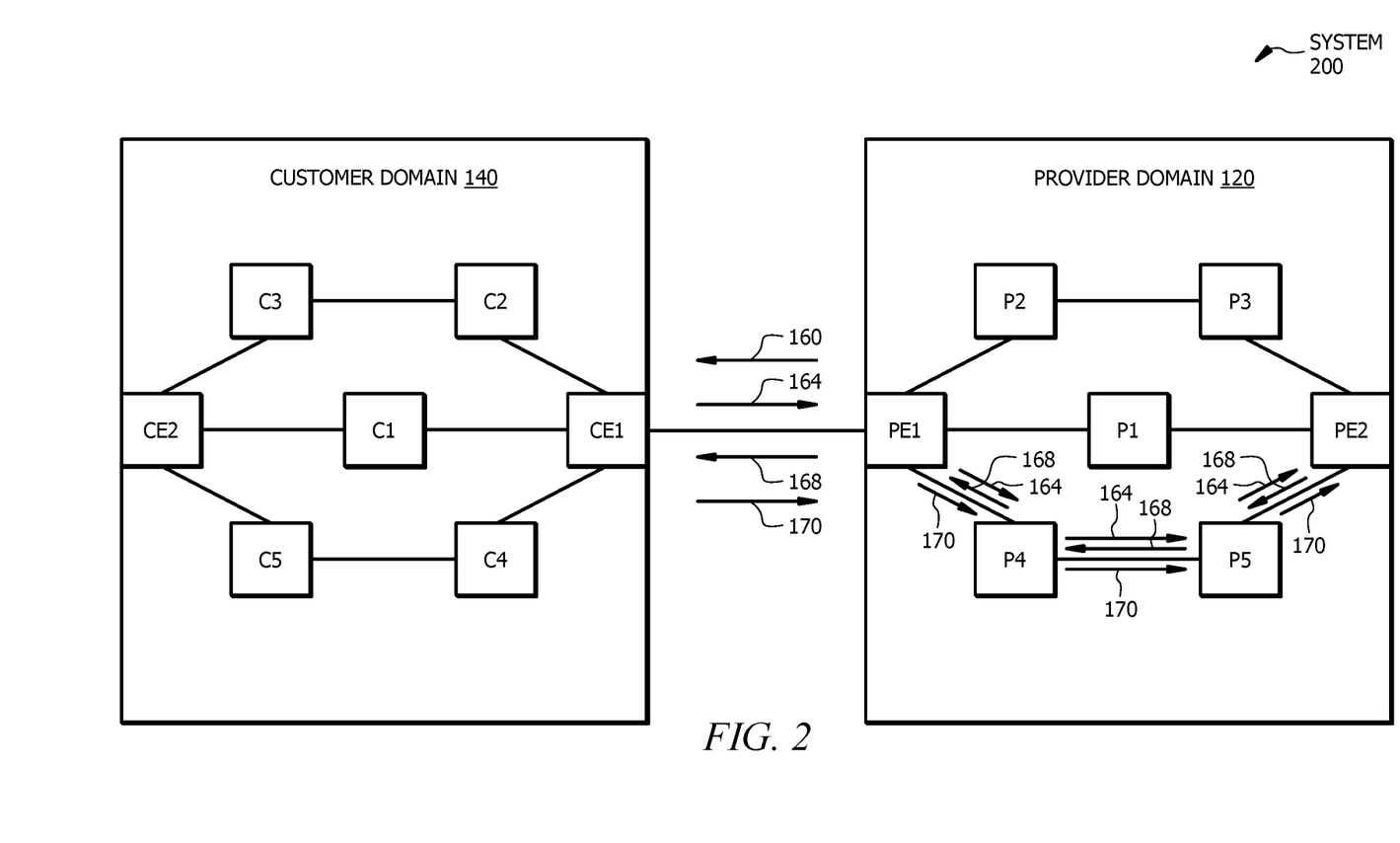
FIG. 2 illustrates another system for determining a secure network path to be used by the system of FIG. 1, in accordance with certain embodiments.
Figure 3:
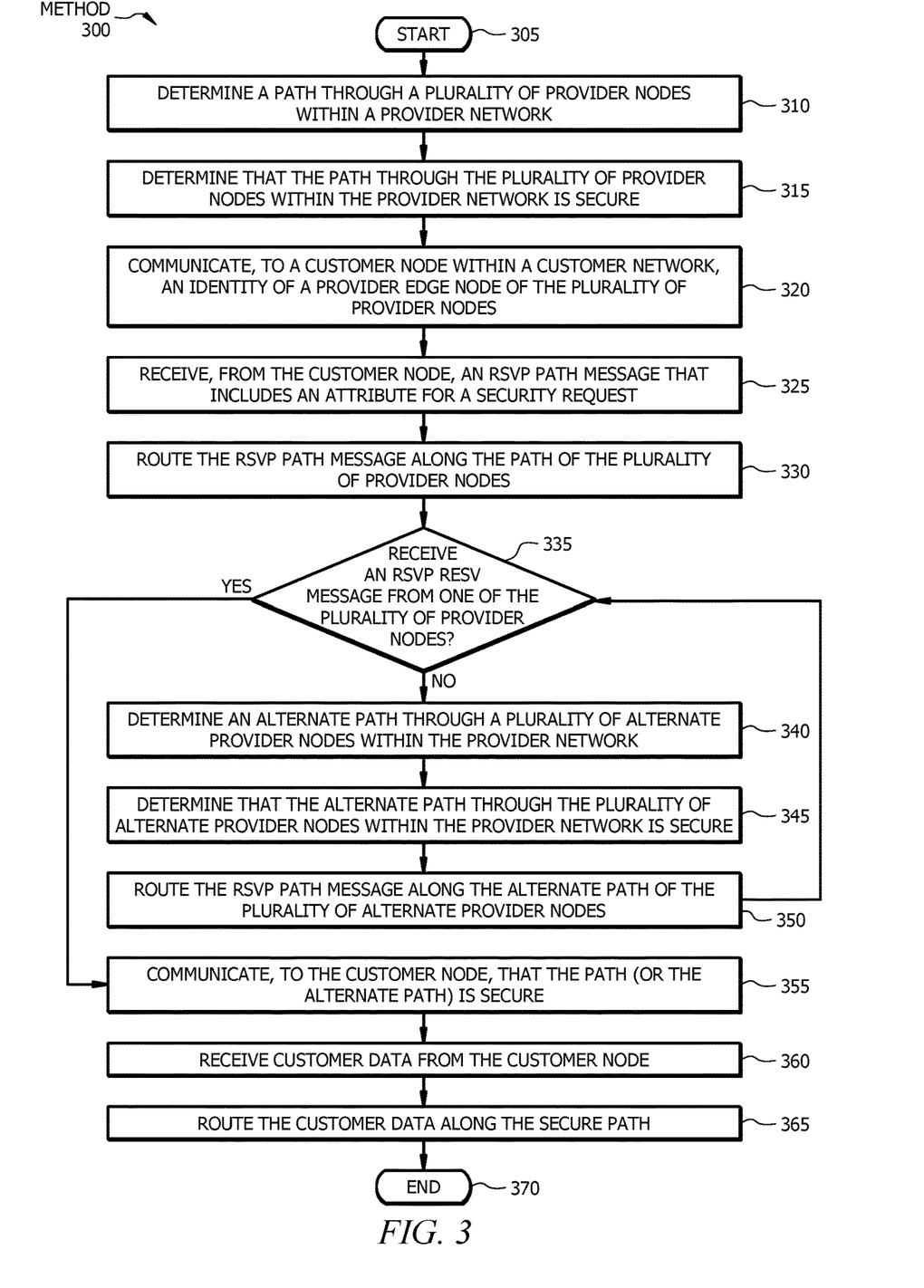
FIG. 3 illustrates a method for determining a secure network path within a provider network, in accordance with certain embodiments.
Figure 4:
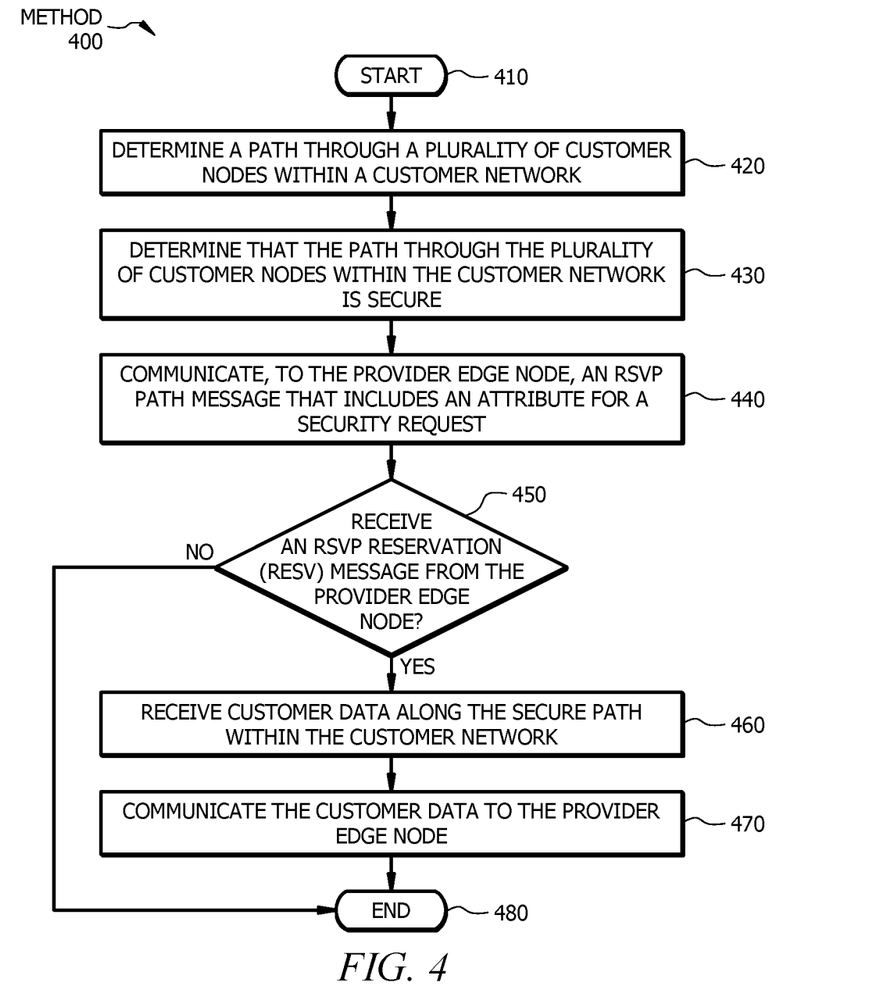
FIG. 4 illustrates a method for determining a secure network path within a customer network, in accordance with certain embodiments.
Figure 5:
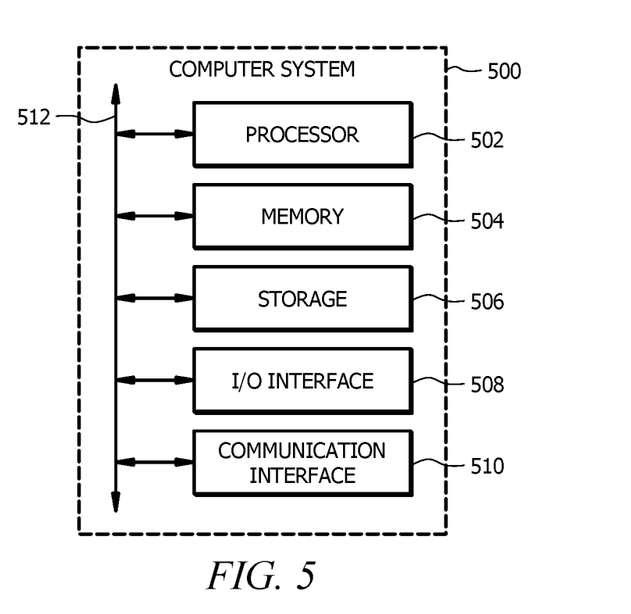
FIG. 5 illustrates a computer system, in accordance with certain embodiments.

FIG. 1 shows an example system for determining a secure network path using RSVP, and FIG. 2 shows another example system for determining a secure network path to be used by the system of FIG. 1. FIG. 3 shows an example method for determining a secure network path within a provider network, and FIG. 4 shows an example method for determining a secure network path within a customer network. FIG. 5 shows an example computer system that may be used by the systems and methods of FIGS. 1 through 4.

FIG. 1 illustrates an example system 100 for determining a secure network path using RSVP. RSVP is transport layer protocol designed to reserve resources across a network for quality of service (QoS). In certain embodiments, system 100 may use RSVP Traffic Engineering (RSVP-TE). RSVP-TE is resource reservation protocol that is used to allocate bandwidth for individual paths through the network. System 100 or portions thereof may be associated with an entity, which may include any entity, such as a business or company (e.g., a service provider) that determines secure network paths. The components of system 100 may include any suitable combination of hardware, firmware, and software. For example, the components of system 100 may use one or more elements of the computer system of FIG. 5.

System 100 includes a network 110, a provider domain 120, and a customer domain 140. Network 110 of system 100 is any type of network that facilitates communication between components of system 100. Network 110 may connect one or more components of system 100. This disclosure contemplates any suitable network. One or more portions of network 110 may include an ad-hoc network, an intranet, an extranet, a VPN, a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like.

Provider domain 120 of system 100 is a group of nodes (e.g., computers and devices) on network 110 that are administered as a unit with common rules and procedures. Provider domain 120 may be associated with any provider, such as an application service provider, a network service provider, an ISP, a security service provider, a telecommunications service provider, an infrastructure service provider, a provider of cloud computing, and the like. One or more components of provider domain 120 may be controlled by the provider. Provider domain 120 includes one or more provider nodes 122, one or more provider edge nodes 124, and a provider controller 126.

Provider nodes 122 of provider domain 120 are connection points within provider domain 120 that receive, create, store and/or send data along a path. Provider nodes 122 are managed by the administrator (e.g., a service provider) of provider domain 120. Provider nodes 122 may include one or more endpoints and/or one or more redistribution points that recognize, process, and forward data to other provider nodes 122. Provider nodes 122 may include virtual and/or physical network nodes. In certain embodiments, one or more provider nodes 122 include data communications equipment such as switches, bridges, modems, hubs, and the like. In some embodiments, one or more provider nodes 122 include data terminal equipment such as routers, servers, printers, workstations, and the like. Certain provider nodes 122 may be host computers.

Provider edge nodes 124 of provider domain 120 are provider nodes 122 within provider domain 120 that act as an interface for communication with nodes of a different domain (e.g., customer edge nodes 144 of customer domain 140). For example, provider edge nodes 124 may be gateway nodes or edge communication nodes. Provider edge nodes 124 are managed by the administrator of provider domain 120. In certain embodiments, one or more provider edge nodes 124 may determine whether one or more provider nodes 122 within provider domain 120 are secure. For example, provider edge node 124 may receive security information from provider controller 126. As another example, provider edge node 124 may derive information from each provider node 122 from IGP advertisements. Examples of IGP include Open Shortest Path First (OSPF), Routing Information Protocol (RIP), Intermediate System to Intermediate System (IS-IS), Enhanced Interior Gateway Routing Protocol (EIGRP), and the like.

Provider edge node 124 of provider domain 120 may determine a security level for each provider node 122 based on the derived information. Provider edge node 124 compares the security level to a predetermined security constraint value. If the security level is below a predetermined security constraint value, provider edge node 124 determines that provider node 122 is secure. If provider edge node 124 cannot determine a security level for a particular provider node 122, provider edge node 124 determines that the particular provider node 122 is compromised.

In certain embodiments, provider edge node 124 of provider domain 120 may communicate a secure message 160 to a node (e.g., customer edge node 144) of customer domain 140. Secure message 160 is any message that is sent over a path that qualifies under predetermined security criteria. The predetermined security criteria is designed to reduce or eliminate the potential for exposure of information traversing the path. Secure message 160 may be an exterior gateway protocol (EGP) message (e.g., a Border Gateway protocol (BGP)), a message communicated using an offline mechanism, and the like. Secure message 160 includes an identity of provider edge node 124. The identity of provider edge node 124 is communicated to the node of customer domain 140 to inform customer domain 140 that provider edge node 124 is a secure entry into provider domain 120. Customer domain may then communicate network path requests to provider edge node 124.

Provider edge node 124 may receive an RSVP path message 164 from customer edge node 144. If provider edge node 124 determines a secure path though provider domain, provider edge node 124 routes RSVP path message 164 along the secure path of provider nodes 122 and/or provider edge nodes 124. RSVP path message 164 is sent from provider edge node 124 to a destination provider node 122. Destination provider node 122 may be identified by a hostname or an IP address in RSVP path message 164. RSVP path message 164 includes an attribute for a security request. The attribute for the security request indicates to provider edge node 124 that customer domain 140 is requesting a secure path to communicate customer data 170 through provider domain 120 to another destination domain or to a destination node within provider domain 120. The attribute for the security request may be in addition to existing attributes (e.g., bandwidth attributes) of RSVP path message 164.

RSVP path message 164 may include a RRO. The RRO stores IP addresses of the traversed nodes. RSVP path message 164 may include LSP attributes, link attributes, and the like. Provider edge node 124 may communicate RSVP path message 164 along the secure path at predetermined intervals (e.g., every 30 seconds.) If one or more provider nodes 122 and/or provider edge nodes 124 that receive RSVP path message 164 do not understand RSVP, that provider node 122 and/or provider edge node 124 may forward RSVP path message 164 without interpreting its contents and will not reserve resources for the flow.

Provider edge node 124 may receive an RSVP resv message 168 from one or more provider nodes 122 and/or provider edge nodes 124. RSVP resv message 168 is communicated from destination provider node 122 to provider edge node 124 through a reverse path of the path traversed by RSVP path message 164. The RSVP resv message 168 may include flow specifications. Provider edge node 124 may verify that the path is secure in response to receiving RSVP resv message 168. Provider edge node 124 may communicate RSVP resv message 168 to customer edge node 144, which indicates to customer edge node 144 that the path is secure. In certain embodiments, RSVP resv message 168 may time out. If RSVP resv message 168 times out, this indicates that one or more provider nodes 122 and/or provider edge nodes 124 did not satisfy one or more constraints of RSVP resv message 168.

In response to receiving RSVP resv message, customer edge node 144 may communicate customer data 170 to provider edge node 124. Customer data 170 is any sensitive information associated with customer domain 140 that may pose a risk to customer domain 140 if discovered by another entity or the general public. Customer data 170 may include personal information (e.g., medical information, biometric data, Social Security numbers, etc.), business information (e.g., trade secrets, financial data, acquisition plans, etc.), classified information pertaining to a government body (e.g., restricted information, confidential information, top secret information, etc.), and the like. Provider edge node 124 then routes customer data 170 along the verified path.

Provider edge node 124 may determine one or more alternate paths along one or more provider nodes 122 and/or provider edge nodes 124 and route RSVP path message 164 along the alternate route in response to one or more conditions. A condition may include provider edge node 124 receiving an RSVP path error message. Provider edge node 124 may determine that the path is not secure in response to receiving the RSVP path error message 168. Another condition may include provider edge node 124 determining that RSVP path message 164 timed out. Other conditions for using alternate paths may include path protection of the original path, Fast Reroute (FRR), and the like.

Provider controller 126 of system 100 is a component that determines secure nodes within provider domain 120. For example, provider controller 126 may determine that one or more provider nodes 122 and/or provider edge nodes 124 of provider domain 120 are secure. Provider controller 126 may determine whether one or more provider nodes 122 and/or provider edge nodes 124 of provider domain 120 are secure by analyzing a security posture of each provider node 122 and/or provider edge node 124. For example, provider controller 126 may verify the security posture of each provider node 122 and/or provider edge node 124 using the underlying hardware of each provider node 122 and/or provider edge node 124. As another example, provider controller 126 may determine the security level of each provider node 122 and/or provider edge node 124 using routing protocols.

In certain embodiments, provider controller 126 may validate certain predetermined security metrics to determine whether each provider node 122 and/or provider edge node 124 is secure. The security metrics may be associated with one or more of the following: a number of vulnerabilities found on a network device, an operating system, an application server, middleware, and the like; an assessment of whether malware protection software has been properly installed and/or is up to date; a determination of whether automatic vulnerability system scans have been performed; a determination of whether penetration testing has been performed; a number of open security exceptions; a determination of whether the design, adoption, and/or delivery of an application is in accordance with an approved written policy, procedure, standard, and/or guideline; a determination of whether access to an application and/or data is in accordance with an approved written policy, procedure, standard, and/or guideline; and the like.

One or more components of system 100 (e.g., provider edge node 124 or provider controller 126) may determine a security level of the path through provider nodes 122 and/or provider edge nodes 124. The security level may be equal to the minimum security level of each provider node 122 and/or provider edge node 124 along the path. If a security level of provider node 122 and/or provider edge node 124 cannot be determined, that corresponding provider node 122 and/or provider edge node 124 is assumed compromised. The security level of the path through provider nodes 122 and/or provider edge nodes 124 may be advertised to one or more components of customer domain 140 in a control plane protocol. For example, the security level may be advertised through Stateful Path Computation Element Protocol (PCEP), BGP Link State (BGP-LS), and the like.

In certain embodiments, the verified path (e.g., the RSVP-TE tunnel) through provider domain 120 may be advertised to one or more components of customer domain 140. The verified path may be advertised with a binding segment ID. In some embodiments, the verified path is hidden from customer domain 140. For example, upon customer domain 140 receiving an indication from provider domain 120 that a path through provider domain 120 is verified, customer domain 140 may communicate customer data 170 to a secure node of provider domain 120 without knowing the path that customer data 170 will travel through customer domain 170.

Customer domain 140 of system 100 is a group of nodes (e.g., computers and devices) on network 110 that are administered as a unit with common rules and procedures. Customer domain 140 may be associated with any customer, such as the Federal Bureau of Investigation (FBI), the United States Department of Defense, a police department, and the like. One or more components of customer domain 140 may be controlled by an entity (e.g., the customer). Customer domain 140 includes customer nodes 142, customer edge nodes 144, and a customer controller 146.

Customer nodes 142 of customer domain 140 are connection points within customer domain 140 that receive, create, store and/or send data along a path. Customer nodes 122 are managed by the administrator of customer domain 140. Customer nodes 142 may include one or more endpoints and one or more redistribution points that recognize, process, and forward data to other customer nodes 142. Customer nodes 142 may include virtual and/or physical network nodes. In certain embodiments, one or more customer nodes 142 include data communications equipment such as switches, bridges, modems, hubs, and the like. In some embodiments, one or more customer nodes 142 include data terminal equipment such as routers, servers, printers, workstations, and the like. One or more customer nodes 142 may be host computers.

Customer edge nodes 144 of customer domain 140 are customer nodes 142 within customer domain 140 that act as an interface for communication with nodes of a different domain (e.g., provider nodes 122 of provider domain 120). For example, customer edge nodes 144 may be gateway nodes or edge communication nodes. Customer edge nodes 144 are managed by the administrator of customer domain 140. In certain embodiments, one or more customer edge nodes 144 may determine whether one or more customer nodes 142 within customer domain 140 are secure. For example, customer edge node 144 may receive security information from customer controller 146. As another example, customer edge node 144 may derive information from each customer node 142 from IGP advertisements. Customer edge node 144 may determine a security level for each customer edge node 142 based on the derived information. Customer edge node 144 compares the security level to a predetermined security constraint value. If the security level is below a predetermined security constraint value, customer edge node 144 determines that customer node 142 is secure.

Customer controller 146 of system 100 is a component that determines secure nodes within customer domain 140. For example, customer controller 146 may determine that one or more customer nodes 142 and/or customer edge nodes 144 of customer domain 140 are secure. Customer controller 146 may determine whether one or more customer nodes 142 and/or customer edge nodes 144 of customer domain 140 are secure by analyzing a security posture of each customer node 142 and/or customer edge node 144. For example, customer controller 146 may verify the security posture of each customer node 142 and/or customer edge node 144 using the underlying hardware of each customer node 142 and/or customer edge node 144. As another example, customer controller 146 may determine the security level of each customer node 142 and/or customer edge node 144 using routing protocols.

In certain embodiments, customer controller 146 may validate certain predetermined security metrics to determine whether each customer node 142 and/or customer edge node 144 is secure. The security metrics may be associated with one or more of the following: a number of vulnerabilities found on a network device, operating system, application server, middleware, and the like; an assessment of whether malware protection software has been properly installed and/or is up to date; a determination of whether automatic vulnerability system scans have been performed; a determination of whether penetration testing has been performed; a number of open security exceptions; a determination of whether the design, adoption, and/or delivery of an application is in accordance with an approved written policy, procedure, standard, and/or guideline; a determination of whether access to an application and/or data is in accordance with an approved written policy, procedure, standard, and/or guideline; and the like.

In operation, provider controller 126 of provider domain 120 determines which provider nodes 122 and provider edge nodes 124 of provider domain 120 are secure. Provider controller 126 communicates the identity of the secure provider nodes 122 and secure provider edge nodes 124 to a particular secure provider edge node 124. Provider edge node 124 determines a secure path through provider nodes 122 and/or provider edge nodes 124. Provider edge node 124 communicates secure message 160 to customer edge node 144 of customer domain 140. Secure message 160 includes an identity of secure provider edge node 124. Customer edge node 144 requests to send a message through a secure path of provider domain 120 by communicating RSVP path message 164 to the secure entry of provider edge node 124. Provider edge node 124 receives RSVP path message 164, which includes an attribute for a security request. Provider edge node 124 routes RSVP path message 164 along the secure path through provider nodes 122 and/or provider edge nodes 124. Provider edge node 124 receives RSVP resv message 168 from provider node 122 along the secure path, which verifies that the path through provider nodes 122 and/or provider edge nodes 124 is secure. Provider edge node 124 communicates RSVP resv message 168 to customer edge node 144. In response to receiving RSVP resv message 168 from provider edge node 124, customer edge node 144 communicates customer data 170 to provider edge node 124, and provider edge node 124 routes customer data 170 along the secure path. As such, system 100 of FIG. 1 allows customer domain 140 to communicate customer data 170 along a path through provider domain 120 that meets specific security criteria.

Although FIG. 1 illustrates a particular arrangement of network 110, provider domain 120, provider nodes 122, provider edge nodes 124, provider controller 126, customer domain 140, customer nodes 142, customer edge nodes 144, customer controller 146, secure message 160, RSVP path message 164, RSVP resv message 168, and customer data 170, this disclosure contemplates any suitable arrangement of network 110, provider domain 120, provider nodes 122, provider edge nodes 124, provider controller 126, customer domain 140, customer nodes 142, customer edge nodes 144, customer controller 146, secure message 160, RSVP path message 164, RSVP resv message 168, and customer data 170. For example, provider domain 120 and customer domain 140 may switch locations such that provider domain 120 receives secure message 160, communicates RSVP path message 164, etc.

Although FIG. 1 illustrates a particular number of networks 110, provider domains 120, provider nodes 122, provider edge nodes 124, provider controllers 126, customer domains 140, customer nodes 142, customer edge nodes 144, customer controllers 146, secure messages 160, RSVP path messages 164, RSVP resv messages 168, and customer data 170, this disclosure contemplates any suitable number of networks 110, provider domains 120, provider nodes 122, provider edge nodes 124, provider controllers 126, customer domains 140, customer nodes 142, customer edge nodes 144, customer controllers 146, secure messages 160, RSVP path messages 164, RSVP resv messages 168, and customer data 170. For example, system 100 may include multiple customer domains 140.

FIG. 2 illustrates an example system 200 for determining a secure network path that may be used by the system of FIG. 1. System 200 includes provider domain 120 and customer domain 140. Provider domain 120 of system 200 includes provider nodes P1, P2, P3, P4, and P5 and provider edge nodes PE1 and PE2. Provider domain 120 includes a first path from PE1 to P2, P2 to P3, and P3 to PE2. Provider domain 120 includes a second path from PE1 to P1 and P1 to PE2. Provider domain 120 includes a third path from PE1 to P4, P4 to P5, and P5 to PE2. Customer domain 140 of system 200 includes customer nodes C1, C2, C3, C4, and C5 and customer edge nodes CE1 and CE2. Customer domain 140 includes a first path from CE1 to C2, C2 to C3, and C3 to CE2. Customer domain 140 includes a second path from CE1 to C1 and C1 to CE2. Customer domain 140 includes a third path from CE1 to C4, C4 to C5, and C5 to CE2.

In the illustrated embodiment of FIG. 2, PE1 of provider domain 120 determines that P4, P5, and PE2 are secure provider nodes. For example, PE1 may derive security level information for P4, P5, and PE1 from a provider controller (e.g., provider controller 126 of FIG. 1) and/or IGP advertisements and determine that P4, P5, and PE2 are secure based on the security level of each node being below a predetermined security constraint value. PE1 may then determine that the third path from PE1 to P4, P4 to P5, and P5 to PE2 is secure. PE1 may determine that certain provider nodes of provider domain 120 are not secure. For example, PE1 may determine that the security level of P1 is above a predetermined security constraint value. Based on this determination, PE1 may determine that P1 is not secure and/or compromised.

PE1 of provider domain 120 communicates secure message 160 to CE1 of customer domain 140, which informs CE1 that PE1 is a secure entry. CE1 requests a path that meets specific security criteria by communicating RSVP path message 164 to PE1. PE1 routes RSVP path message 164 along the third path from PE1 to P4, P4 to P5, and P5 to PE2. PE2, upon receiving RSVP path message 164, generates RSVP resv message 168 and communicates RSVP resv message 168 to PE1 along the reverse path from PE2 to P5, P5 to P4, and P4 to PE1. In response to receiving RSVP resv message 168, PE1 verifies that the third path is secure. PE1 communicates RSVP resv message 168 to CE1. In response to receiving RSVP resv message 168, CE1 communicates customer data 170 to PE1. PE1 routes customer data 170 along the third route.

In certain embodiments, in response to routing RSVP path message 164 along the third path, PE1 may not receive RSVP resv message 168 or may receive an RSVP path error message, indicating that the third path is not secure. If PE1 determines that the third path is not secure, PE1 may route RSVP path message 164 along an alternate route. For example, PE1 may route RSVP path message 164 along the first route from PE1 to P2, P2 to P3, and P3 to PE2. PE1 will not route RSVP path message 164 along a path in which PE1 determines that one or more provider nodes of the path are not secure. In some embodiments, PE1 may route RSVP path message 164 along an alternate route even though the original route is secure. For example, PE1 may route RSVP path message 164 along an alternate route due to path protection, FRR, and the like.

Although FIG. 2 illustrates a particular arrangement of provider domain 120, provider nodes P1, P2, P3, P4, and P5, provider edge nodes PE1 and PE2, customer domain 140, customer nodes C1, C2, C3, C4, and C5, customer edge nodes CE1 and CE 2, secure message 160, RSVP path message 164, RSVP resv message 168, and customer data 170, this disclosure contemplates any suitable arrangement of provider domain 120, provider nodes P1, P2, P3, P4, and P5, provider edge nodes PE1 and PE2, customer domain 140, customer nodes C1, C2, C3, C4, and C5, customer edge nodes CE1 and CE 2, secure message 160, RSVP path message 164, RSVP resv message 168, and customer data 170. For example, provider domain 120 and customer domain 140 may be switched such that customer domain 140 receives RSVP path message 164 from provider domain 120 and routes RSVP path message 164 along its third route.

Although FIG. 2 illustrates a particular number of provider domains 120, provider nodes P1, P2, P3, P4, and P5, provider edge nodes PE1 and PE2, customer domains 140, customer nodes C1, C2, C3, C4, and C5, customer edge nodes CE1 and CE 2, secure messages 160, RSVP path messages 164, RSVP resv messages 168, and customer data 170, this disclosure contemplates any suitable number of provider domains 120, provider nodes P1, P2, P3, P4, and P5, provider edge nodes PE1 and PE2, customer domains 140, customer nodes C1, C2, C3, C4, and C5, customer edge nodes CE1 and CE 2, secure messages 160, RSVP path messages 164, RSVP resv messages 168, and customer data 170. For example, provider domain 120 may include more or less than five provider nodes (e.g., 1000 provider nodes) and/or two provider edge nodes. As another example, customer domain 140 may include more or less than five customer nodes (e.g., 1000 customer nodes) and/or two customer edge nodes.

FIG. 3 illustrates an example method 300 for determining a secure network path within a provider network. Method 300 begins at step 305. At step 310, a provider node (e.g., PE1 of FIG. 2) of a provider network (e.g., provider domain 120 of FIG. 2) determines a path through a plurality of provider nodes (e.g., P4, P5, and PE2 of FIG. 2) within the provider network. Method 300 then moves from step 310 to step 315, where the provider node determines that the path through the plurality of provider nodes within the provider network is secure. For example, the provider node may receive IGP advertisements from each of the plurality of provider nodes along the path and determine a security level for each of the plurality of provider nodes from information included in the IGP advertisements. As another example, the provider node may receive security information for each of the plurality of provider nodes along the path from a provider controller (e.g., provider controller 126 of FIG. 1) and determine a security level for each of the plurality of provider nodes from the security information. The provider node may determine that the security level of each of the plurality of provider nodes is below a predetermined security constraint value. Based on this determination, the provider node may determine that the path through the plurality of provider nodes is secure. As still another example, the provider node may receive an identity of the secure provider nodes of the provider network from the provider controller.

Method 300 then moves from step 315 to step 320, where the provider node communicates its identity to a customer node of a customer network (e.g., customer domain 140 of FIG. 2.) The provider node may communicate its identity to the customer node using a secure message (e.g., secure message 160 of FIG. 2.) Method 300 then moves from step 320 to step 325, where the provider node receives an RSVP path message (e.g., RSVP path message 164 of FIG. 2) from the customer node. The RSVP path message may include an attribute for a security request that indicates to the provider node that the customer domain is requesting a secure path through the customer network to a destination node (e.g., PE2 of FIG. 2). The RSVP path may also include an RRO, LSP attributes, link attributes, bandwidth constraint attributes, and the like. Method 300 then moves from step 325 to step 330.

At step 330, the provider node routes the RSVP path message along the path of the plurality of provider nodes. For example, the provider node may route the RSVP path message along the third path of system 200 of FIG. 2. Method 300 then moves from step 330 back to step 335, where the provider node determines whether it has received an RSVP resv message from one of the provider nodes (e.g., P4 of FIG. 2) along the path. If the provider node receives an RSVP resv message from one of the provider nodes along the path, method 300 advances from step 335 to step 355.

If the provider node does not receive an RSVP resv message from one or the provider nodes along the path, method 300 moves from step 335 to step 340, where the provider node determines an alternate path through a plurality of alternate provider nodes within the provider network. For example, the provider node may route the RSVP path message along the first path of system 200 of FIG. 2. Method 300 then moves from step 340 to step 345, where the provider node determines whether the alternate path through the plurality of alternate provider nodes within the provider network is secure. For example, the provider node may receive IGP advertisements from each of the plurality of alternate provider nodes along the path and determine a security level for each of the plurality of alternate provider nodes from information included in the IGP advertisements. The provider node may determine that the security level of each of the plurality of alternate provider nodes is below a predetermined security constraint value. Based on this determination, the provider node may determine that the path through the plurality of alternate provider nodes is secure. As another example, the provider node may receive an identity of the secure alternate provider nodes of the provider network from a provider controller (e.g., provider controller 126 of FIG. 1.) Method 300 then moves from step 345 to step 350.

At step 350, the provider node routes the RSVP path message along the alternate path of the plurality of alternate provider nodes. For example, the provider node may route the RSVP path message along the first path of system 200 of FIG. 2. Method 300 them moves from step 350 back to step 335, where the provider node determines whether it has received an RSVP resv message from one of the alternate provider nodes (e.g., P2 of FIG. 2) along the path. If the provider node receives an RSVP resv message from one of the alternate provider nodes along the path, method 300 advances from step 335 to step 350. Otherwise, steps 340 through 350 are repeated until an RSVP resv message is received.

At step 355, the provider node communicates that the path (or the alternate path) is secure to the customer node. For example, the provider node may forward the RSVP resv message to the customer node. Method 300 then moves from step 355 to step 360, where the provider node receives customer data (e.g., customer data 170 of FIG. 2) from the customer node. Method 300 then moves from step 360 to step 365, where the provider node routes the customer data along the secure path. Method 300 ends at step 370.

Although this disclosure describes and illustrates particular steps of method 300 of FIG. 3 as occurring in a particular order, this disclosure contemplates any suitable steps of method 300 of FIG. 3 occurring in any suitable order. For example, steps 310 and 315 directed to determining a secure path through a plurality of provider nodes within a provider network may be performed after step 325 directed to receiving an RSVP path message that indicates an attribute for a security request.

Although this disclosure describes and illustrates an example method 300 for determining a secure network path within a provider network including the particular steps of the method of FIG. 3, this disclosure contemplates any suitable method 300 for determining a secure network path within a particular network, including any suitable steps, which may include all, some, or none of the steps of the method of FIG. 3, where appropriate. For example, the terms "provider" and "customer" of method 300 may be interchanged such that method 300 is directed to determining a secure network path within the customer network.

Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3. For example, a provider controller (e.g., provider controller 126 of FIG. 1) may perform one or more of the steps of method 300.

FIG. 4 illustrates an example method 400 for determining a secure network path within a provider network. Method 400 begins at step 410. At step 420, a customer node (e.g., CE1 of FIG. 2) of a customer network (e.g., customer domain 140 of FIG. 2) determines a path through a plurality of customer nodes (e.g., C4, C5, and CE2 of FIG. 2) within the customer network. Method 400 then moves from step 420 to step 430, where the customer node determines that the path through the plurality of customer nodes within the customer network is secure. For example, the customer node may receive IGP advertisements from each of the plurality of customer nodes along the path and determine a security level for each of the plurality of customer nodes from information included in the IGP advertisements. The customer node may determine that the security level of each of the plurality of customer nodes is below a predetermined security constraint value. Based on this determination, the customer node may determine that the path through the plurality of customer nodes is secure. As another example, the customer node may receive an identity of each of the secure customer nodes of the customer network from a customer controller (e.g., customer controller 146 of FIG. 1.)

Method 400 then moves from step 430 to step 440, where the customer node communicates an RSVP path message (e.g., RSVP path message 164 of FIG. 2) to a provider node (e.g., provider edge node PE1 of FIG. 2.) The RSVP path message may include an attribute for a security request that indicates to the provider node that the customer domain is requesting a secure path through the provider network to a destination node (e.g., PE2 of FIG. 2). The RSVP path may also include an RRO, LSP attributes, link attributes, bandwidth attributes, and the like. Method 400 then moves from step 440 to step 450.

At step 450, the customer node determines whether it has received an RSVP resv message from the provider node, which indicates that the provider node can provide a secure path through the provider network. If the customer node does not receive an RSVP resv message from the provider node, method 400 advances from step 450 to step 480, where method 400 ends. If the customer node receives an RSVP resv message from the provider node, method 400 moves from step 450 to step 460, where the customer node receives customer data (e.g., customer data 170 of FIG. 1) along the secure path within the customer network. Method 400 then moves from step 460 to step 470, where the customer node communicates the customer data to the provider node, which allows the provider node to route the customer data along a secure path within its network. Method 400 then moves from step 470 to step 480, where method 400 ends.

Although this disclosure describes and illustrates particular steps of method 400 of FIG. 4 as occurring in a particular order, this disclosure contemplates any suitable steps of method 400 of FIG. 4 occurring in any suitable order. Moreover, although this disclosure describes and illustrates an example method 400 for determining a secure network path within a customer network including the particular steps of the method of FIG. 4, this disclosure contemplates any suitable method 400 for determining a secure network path within a customer network, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. An apparatus, comprising:
one or more processors; and
one or more computer-readable non-transitory storage media coupled to the one or more processors and comprising instructions that, when executed by the one or more processors, cause the apparatus to perform operations comprising:
determining, by a provider node, a path through a plurality of provider nodes within a provider network;
determining that the path through the plurality of provider nodes within the provider network is secure;
receiving, from a customer node within a customer network, a Resource Reservation Protocol (RSVP) path message comprising an attribute for a security request;
routing the RSVP path message along the path of the plurality of provider nodes; and
verifying, after receiving the RSVP path message from the customer node and after determining that the path through the plurality of provider nodes within the provider network is secure, that the path through the plurality of provider nodes within the provider network is secure;
wherein determining that the path through the plurality of provider nodes within the provider network is secure is performed prior to receiving the RSVP path message from the customer node.

2. The apparatus of claim 1, the operations further comprising:
receiving an RSVP reservation (resv) message from one of the plurality of provider nodes;
verifying that the path through the plurality of provider nodes is secure based on the RSVP resv message;
communicating, to the customer node, that the path through the plurality of provider nodes is secure;
receiving, from the customer node, customer data; and
routing the customer data along the path of the plurality of provider nodes.

3. The apparatus of claim 1, the operations further comprising:
determining an alternate path through a plurality of alternate provider nodes within the provider network;
determining that the alternate path through the plurality of alternate provider nodes within the provider network is secure;
receiving an RSVP path error message from one of the plurality of provider nodes; and
routing the RSVP path message along the alternate path of the plurality of alternate provider nodes in response to receiving the RSVP path error message.

4. The apparatus of claim 1, wherein:
the apparatus is a provider edge node of the plurality of provider nodes;
the operations further comprise communicating an identity of the provider edge node to the customer node; and
the RSVP path message is received by the provider edge node from the customer node in response to communicating the identity of the provider edge node to the customer node.

5. The apparatus of claim 1, wherein determining that the path through the plurality of provider nodes within the provider network is secure comprises:
deriving information from each of the plurality of provider nodes from at least one of the following:
interior gateway protocol (IGP) advertisements; and
a controller of the provider network;
determining a security level for each of the plurality of provider nodes based on the derived information; and
determining that the security level of each of the plurality of provider nodes is below a predetermined security constraint value.

6. The apparatus of claim 1, wherein the RSVP path message further comprises at least one of the following:
a Record Route Object (RRO);
Label Switched Paths (LSP) attributes; and
link attributes.

7. A method, comprising:
determining, by a provider node, a path through a plurality of provider nodes within a provider network;
determining that the path through the plurality of provider nodes within the provider network is secure;
receiving, from a customer node within a customer network, a Resource Reservation Protocol (RSVP) path message comprising an attribute for a security request;
routing the RSVP path message along the path of the plurality of provider nodes; and
verifying, after receiving the RSVP path message from the customer node and after determining that the path through the plurality of provider nodes within the provider network is secure, that the path through the plurality of provider nodes within the provider network is secure;
determining that the path through the plurality of provider nodes within the provider network is secure prior to receiving the RSVP path message from the customer node.

8. The method of claim 7, further comprising:
receiving an RSVP reservation (resv) message from one of the plurality of provider nodes;
verifying that the path through the plurality of provider nodes is secure based on the RSVP resv message;
communicating, to the customer node, that the path through the plurality of provider nodes is secure;
receiving, from the customer node, customer data; and
routing the customer data along the path of the plurality of provider nodes.

9. The method of claim 7, further comprising:
determining an alternate path through a plurality of alternate provider nodes within the provider network;
determining that the alternate path through the plurality of alternate provider nodes within the provider network is secure;
receiving an RSVP path error message from one of the plurality of provider nodes; and
routing the RSVP path message along the alternate path of the plurality of alternate provider nodes in response to receiving the RSVP path error message.

10. The method of claim 7, further comprising communicating an identity of a provider edge node to the customer node, wherein the RSVP path message is received by the provider edge node from the customer node in response to communicating the identity of the provider edge node to the customer node.

11. The method of claim 7, wherein determining that the path through the plurality of provider nodes within the provider network is secure comprises:

deriving information from each of the plurality of provider nodes from at least one of the following:
  interior gateway protocol (IGP) advertisements; and
  a controller of the provider network;
determining a security level for each of the plurality of provider nodes based on the derived information; and
determining that the security level of each of the plurality of provider nodes is below a predetermined security constraint value.

12. The method of claim 7, wherein the RSVP path message further comprises at least one of the following:
  a Record Route Object (RRO);
  Label Switched Paths (LSP) attributes; and
  link attributes.

13. One or more computer-readable non-transitory storage media embodying instructions that, when executed by a processor, cause the processor to perform operations comprising:
  determining, by a provider node, a path through a plurality of provider nodes within a provider network;
  determining that the path through the plurality of provider nodes within the provider network is secure;
  receiving, from a customer node within a customer network, a Resource Reservation Protocol (RSVP) path message comprising an attribute for a security request;
  routing the RSVP path message along the path of the plurality of provider nodes; and
  verifying, after receiving the RSVP path message from the customer node and after determining that the path through the plurality of provider nodes within the provider network is secure, that the path through the plurality of provider nodes within the provider network is secure;
  wherein determining that the path through the plurality of provider nodes within the provider network is secure is performed prior to receiving the RSVP path message from the customer node.

14. The one or more computer-readable non-transitory storage media of claim 13, the operations further comprising:
  receiving an RSVP reservation (resv) message from one of the plurality of provider nodes;
  verifying that the path through the plurality of provider nodes is secure based on the RSVP resv message;
  communicating, to the customer node, that the path through the plurality of provider nodes is secure;
  receiving, from the customer node, customer data; and
  routing the customer data along the path of the plurality of provider nodes.

15. The one or more computer-readable non-transitory storage media of claim 13, the operations further comprising:
  determining an alternate path through a plurality of alternate provider nodes within the provider network;
  determining that the alternate path through the plurality of alternate provider nodes within the provider network is secure;
  receiving an RSVP path error message from one of the plurality of provider nodes; and
  routing the RSVP path message along the alternate path of the plurality of alternate provider nodes in response to receiving the RSVP path error message.

16. The one or more computer-readable non-transitory storage media of claim 13, wherein:
  the operations further comprise communicating an identity of a provider edge node to the customer node; and
  the RSVP path message is received by the provider edge node from the customer node in response to communicating the identity of the provider edge node to the customer node.

17. The one or more computer-readable non-transitory storage media of claim 13, wherein determining that the path through the plurality of provider nodes within the provider network is secure comprises:
  deriving information from each of the plurality of provider nodes from at least one of the following:
    interior gateway protocol (IGP) advertisements; and
    a controller of the provider network;
  determining a security level for each of the plurality of provider nodes based on the derived information; and
  determining that the security level of each of the plurality of provider nodes is below a predetermined security constraint value.

18. The one or more computer-readable non-transitory storage media of claim 13, wherein the RSVP path message further comprises at least one of the following:
  a Record Route Object (RRO);
  Label Switched Paths (LSP) attributes; and
  link attributes.

* * * * *